Dec. 1, 1970  SUMIO UOZUMI ET AL  3,543,611
HYDRAULIC CONTROL SYSTEM OF AN AUTOMATIC TRANSMISSION
Filed April 25, 1969  2 Sheets-Sheet 1

INVENTORS
Sumio Uozumi
Ichio Sakai
BY George B. Oujevolk
ATTORNEY

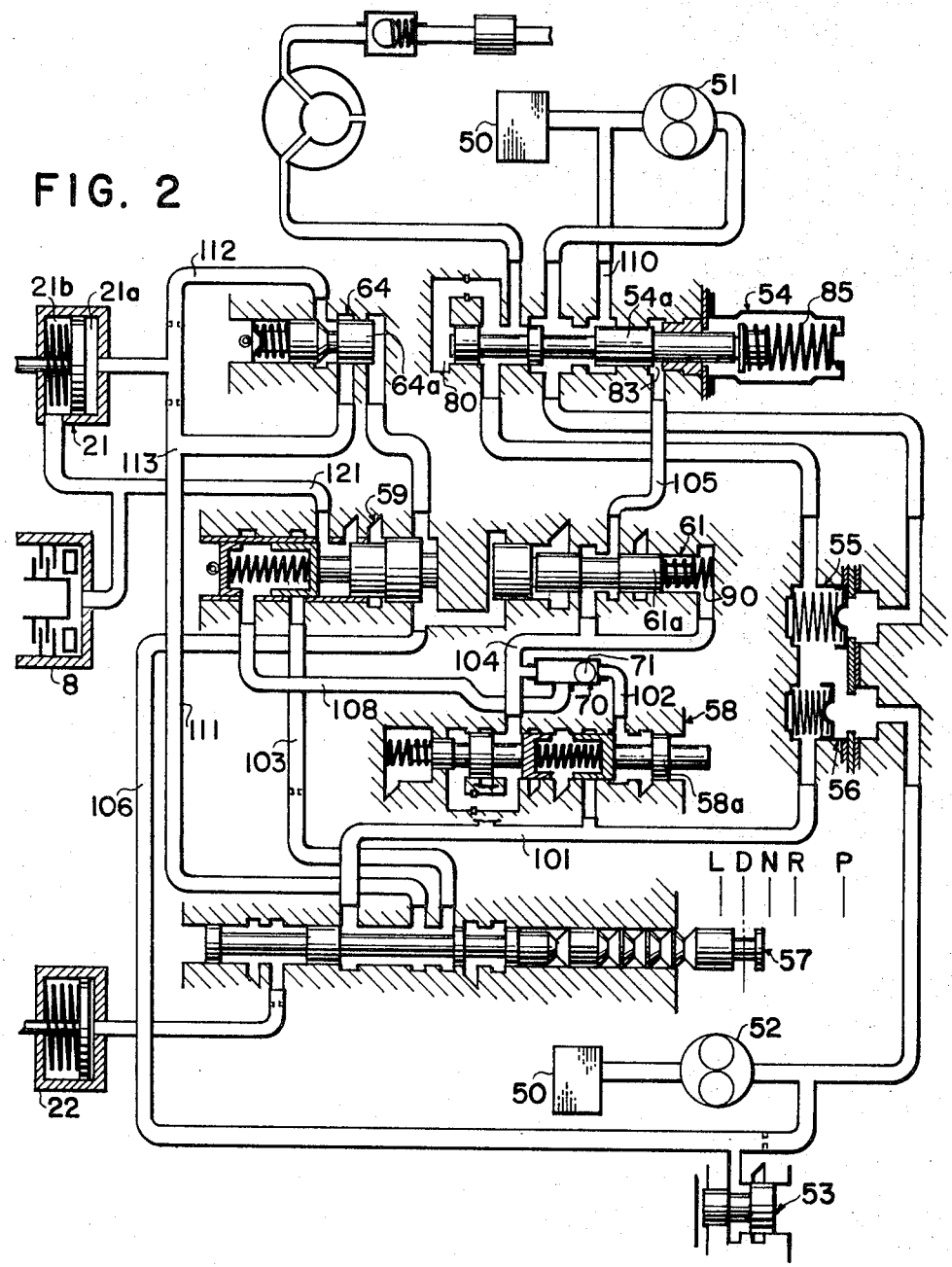

United States Patent Office 3,543,611
Patented Dec. 1, 1970

3,543,611
HYDRAULIC CONTROL SYSTEM OF AN
AUTOMATIC TRANSMISSION
Sumio Uozumi and Ichio Sakai, Toyota-shi, Japan, assignors to Toyota Jidosha Kogyo Kabushiki Kaisha, Toyota-shi, Aichi-ken, Japan, a corporation of Japan
Filed Apr. 25, 1969, Ser. No. 819,403
Claims priority, application Japan, May 27, 1968,
43/35,905
Int. Cl. B60k 19/12; G05g 9/00
U.S. Cl. 74—867    2 Claims

ABSTRACT OF THE DISCLOSURE

An automatic transmission hydraulic control system which provides high hydraulic pressure required by servo units when applying engine brake at low and reverse speeds. The throttle valve is operably interconnected with the manual shift valve by means of a link mechanism provided with a special shaped cam. In this way, a high control pressure is maintained at low and reverse speeds and applied to the hydraulic servos.

BACKGROUND OF THE INVENTION

The present invention relates to a hydraulic control system of a fluid automatic transmission for use of motor vehicles.

One of conventional automotive transmissions has a torque converter, a clutch and a planetary gear unit. Speed changes are carried out by different driving connections between the input and output shafts of the transmission through the clutch and the planetary gear unit. For this purpose the clutch and the planetary gear unit are provided with hydraulic servos, respectively, and are hydraulically operated. Those servos require a powerful control pressure especially at a low speed range and the reverse speed ranges. There have been employed various means for providing such a powerful control pressure. The present invention is designed to provide a powerful control pressure to the hydraulic servos at the low speed range and also at the reverse speed range.

SUMMARY OF THE INVENTION

According to the present invention, the throttle valve in the hydraulic control system is operably interconnected with the manual shift valve by means of a link mechanism provided with a special shaped cam. In this way, a high control pressure is maintained at low speed ranges and reverse speed ranges and is applied to the hydraulic servos. No additional special control valves, lines etc. are required in the hydraulic control system. The arrangement provides a forcible and sufficient brake on the clutches and brake bands and, at the same time minimizes the size of the hydraulic control system and simplifies the construction.

OBJECT OF THE INVENTION

Thus, the object of this invention is to provide a hydraulic control system for a transmission having a fluid torque converter, and a speed change gearing with hydraulic servos. During ordinary running speed (at the drive speed range of the motor vehicle) an operating pressure oil proportional to an opening of engine throttle valve is applied to a pressure regulator valve for the hydraulic servos so as to provide oil pressure porportional to the opening of the engine valve to work on the servos. At the time of applying the engine brake at the low speed range (when the opening of the engine throttle valve is very small) and also reverse range, sufficient pressure is maintained by means of a special cam shift mechanism without any additional hydraulic lines. The hydraulic control system according to this invention is applicable to automatic transmissions having a torque converter consisting of a pump, turbine, and stator, and a speed change gear unit controlled by brake bands, clutches and so on.

The invention as well as other objects and advantages thereof will be more apparent from the following detailed description when taken in conjunction with the accompanying drawings, in which:

BRIEF EXPLANATION OF THE DRAWINGS

FIG. 2 is a hydraulic diagram of one embodiment of the control system according to the present invention;

DESCRIPTION OF THE PREFERRED EMBODIMENT

At the outset a distinction must be made between range and speed.

On the manual valve are the letters L, and D which correspond to the low, and drive position of the manual valve. When the driver enters the automobile he places his valve in the drive range position D and starts off. At first he travels slowly at slow speed. Then, the transmission will automatically shift to higher speed and finally to higher speed. Thus low speed and low range L do not have the same meaning since low speed also exists in the drive range.

Figure 1:
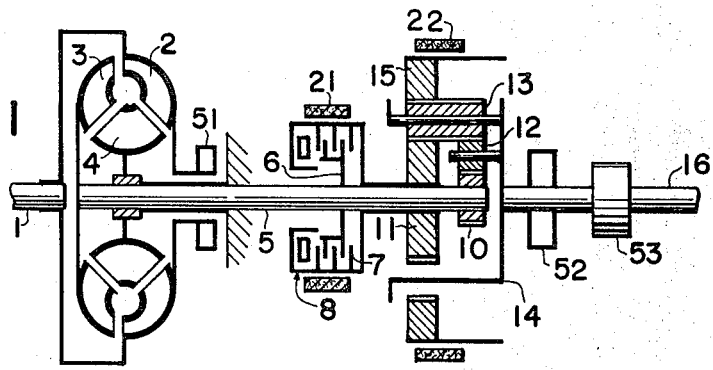
FIG. 1 is a schematic representation of one embodiment of transmissions in which the hydraulic control system incorporating the present invention is applicable.

FIG. 1 is one example showing a schematic view of an automatic transmission of forward two-speeds and backward one-speed.

Explaining the invention with reference to FIG. 1, 2 is a pump impeller directly coupled to the engine crank shaft 1. The engine power is transmitted by the pump impeller 2 to a turbine runner 3 through oil and the oil is guided by a stator 4 to enter the pump impeller 2 again. By repetition of the above oil flow motion, rotation power is provided to the turbine shaft 5. The turbine rotation power thus provided is transmitted to the speed change gear unit provided behind the torque converter by the turbine shaft, thereby, a variable speed change mechanism of forward two-speeds and backward one-speed as well as a planetary gear unit can be assembled by automatically controlling the clutches 8 and brake bands 21, 22 by means of the requisite servo hydraulic pressures.

In the speed change gear unit behind the torque converter, the turbine runner 3 is directly connected to the turbine shaft 5 to play a role in the input shaft of the planetary gear unit. A hub 6 of the clutch 8 and an input sun gear 10 are on the turbine shaft.

A low sun gear 11 is connected to a clutch drum and disc 7 as a unit which is associated with the hub 6 through a number of clutches. Pinions 12, 13 which mesh with each other are held by a carrier 14 and form a gear train unit with the output shaft 16 and respectively mesh with the input sun gear 10, low sun gear 11 and ring gear 15. Brake bands 21, 22 are provided on the outer periphery of the clutch drum and ring gear. The operation of forward two-speeds and backward one-speed is as follows:

The first speed

By actuating front brake band 21 to fix the clutch drum and the low sun gear 11, the rotation from the turbine shaft 5 is reduced to be transmitted to the output shaft 16 so that the first speed is obtained.

The second speed

By actuating the clutch 8 to incorporate the planetary gears in a body, the drive from the turbine shaft 5 to the output shaft 16 becomes a direct connection, thereby the second speed is obtained.

Reverse speed

By actuating rear band 22 to stop the rotation of ring gear 15, the rotation of the turbine shaft 5 is reversed and reduced so as to be transmitted to the output shaft 16. Thus the reverse speed is obtained.

This invention relates to the hydraulic pressure controlling means for control of the servo oil pressure acting on the above clutches and brake bands 21, 22.

In the hydraulic pressure system of the present invention, various hydraulic lines are controlled by valves. The actions of the following valves are to be considered:

(I) Speed shift valve ------------------------- 59
(II) Changeover valve ------------------------- 61
(III) Pressure regulator valve ----------------- 54
(IV) Check ball valve unit --------------------- 70
(V) Manual valve ------------------------------ 57
(VI) Throttle valve --------------------------- 58

In the hydraulic diagram of FIG. 2, the oil is pumped up from an oil sump 50 by a front oil pump 51 directly driven by the engine through the pump impeller 2 and a rear oil pump 52 driven by the output shaft 16 to be supplied to the line pressure circuit 101.

The hydraulic pressure of this line 101 is adjusted by a pressure regulator valve 54 to be applied to a throttle valve 58. Also, this pressure is applied to a line 103 through a manual valve 57 at the D position (drive range). The engine throttle valve opening is perceived as a displacement of throttle plug 58a by the throttle valve 58, this producing a hydraulic pressure proportional to this displacement, or the opening in a line 104. This hydraulic pressure is called a throttle pressure $Pth$. On the other hand, the vehicle speed is detected by the governor 53 rotating with the output shaft 16 to be applied to a line 106 as a governor pressure $Pgo$.

The reduction ratio of the planetary gearing is changed over by a shift valve (speed change valve) 59 operated by the throttle pressure $Pth$ and governor pressure $Pgo$.

The speed shift valve 59

At the drive or D position of manual valve 57, the line pressure PL is also working in the hydraulic pressure line 111 communicating with manual valve 57 to the front brake band 21, so that hydraulic pressure is supplied to the servo piston operating side of the brake band 21. When there is no hydraulic pressure in line 121, the brake band 21 is actuated and releases front clutch 8, thus the speed change for the first speed is carried out. When a certain speed is attained equivalent to the engine throttle valve opening, the shift valve 59 is actuated by the governor pressure to move leftwards to communicate line 103 to line 121. Then, the line pressure acts on the clutch 8 and at the same time acts on the servo piston releasing side, accordingly brake band 21 is released and clutch 8 comes to the operating condition. Under these conditions, the planetary gearing rotates as one gear train and the drive from the turbine shaft to the output shaft acts as a direct connection. Thus, the speed change for second speed is carried out. The speed shift from direct drive to reduction drive can be obtained by releasing the hydraulic pressure of the line 121 by shift valve 59.

The magnitude of the hydraulic pressure is controlled by change over valve 61 and the pressure regulator valve 54. Also, this invention particularly relates to the means for establishing the requisite operating hydraulic pressures at the L position (low range) and the R position (reverse range) of the manual valve 57.

Changeover valve 61

The changeover valve 61 is so arranged that the governor pressure $Pgo$ of pressure line 106 supplying a pressure which is proportional to the vehicle speed works on the left end surface of the valve piece 61a and the throttle pressure ($Pth$) of pressure line 104 supplying a pressure which is proportional to the engine throttle valve opening and the spring pressure of coil spring 90 works on the right end surface of the valve piece 61a so that the valve piece 61a moves in the right and left directions, however since the spring pressure of coil spring 90 is set to always keep a constant value, changeover valve 61 operates according to the pressure change of the governor pressure and the throttle pressure.

That is, when the vehicle speed of output shaft 16 is low so that the governor pressure $Pgo$ is low, the valve piece 61a is moved in the left direction by the throttle pressure $Pth$, thus connecting pressure line 104 to pressure line 105, the throttle pressure of line 104 is applied to the pressure regulator valve 54 through the line 105.

When the vehicle speed of output shaft 16 becomes high and the governor pressure $Pgo$ comes up, the governor pressure overcomes the spring pressure of coil spring 90 and the throttle pressure $Pth$, and moves the valve body 61a in the right direction, thus shutting off the above line 105 from the line 104 the pressure in the line 105 is released to the exhaust port. The change over point of this changeover valve piece 61a shifts to the higher side as the throttle pressure $Pth$ becomes higher, particularly at L range the throttle pressure is adjusted at a high pressure so that this shift point is settled at a higher speed range capable of effectively developing an engine brake.

Pressure regulation valve 54

Pressure regulator valve 54 serves to regulate the line pressure to supply the clutch 8 and brake bands 21, 22. The oil fed from the oil pumps 51 and 52 is working in the chamber 80 at the left portion of the valve piece 54a through the line 101. On the other hand, at the right portion of the valve spool 54a a coil spring 85 is provided at the valve end side and a chamber is also provided where the hydraulic pressure of line 105 is to be supplied. Valve spool 54a is controlled by hydraulic pressure acting in chamber 80 at the left side and the spring pressure of coil spring 85 and hydraulic pressure acting in chamber 83 at the right side to move valve spool 54a in the left and right directions. Now, assuming that the vehicle speed is low, valve piece 61a has moved in the left direction and the throttle pressure is being supplied to line 105. This throttle pressure is supplied to the right chamber 83 to move the valve spool 54a in the left direction cooperating with the spring pressure of coil spring 85, so that oil in the left chamber 80 produces a pressure corresponding to the pressure in the right chamber, i.e., a line pressure PL is produced which is to be supplied to the requisite clutches and brake bands from the line 101. Thus, the throttle pressure $Pth$ corresponds to the line pressure, i.e., when there is a fully closed condition of engine throttle valve the line pressure PL also becomes low and when there is a high throttle pressure $Pth$ (when in the fully opened condition of engine throttle valve) the line pressure PL becomes also high. This is the condition before step-down shown in the characteristic line diagram of FIG. 4.

Interconnection of valves 54 and 61

Next, when the vehicle speed further increases, the valve spool 61a of change over valve 61 moves rightwards to shutoff line 105 from line 104 thus releasing the hydraulic pressure of line 105 to the exhaust port, hydraulic pressure in chamber 80 becomes a low pressure but always kept constant irrespective of the throttle pressure $Pth$, which is supplied as a line pressure PL from the line 101. This is the condition after step-down shown in the characteristic line diagram of FIG. 4.

Check ball valve unit 70

Check ball valve unit 70 is provided among three lines 108, 104, and 102, which contains a ball 71. When supplying the throttle pressure $Pth$ to the line 108 from the line 104, the ball moves in the right direction to close the line 102 and on the other hand when supplying the line pressure PL from the line 102 to the line 108 at kick down the ball 71 moves in the left direction, to close the line 104.

Manual valve 57 (speed shift)

Figure 4:
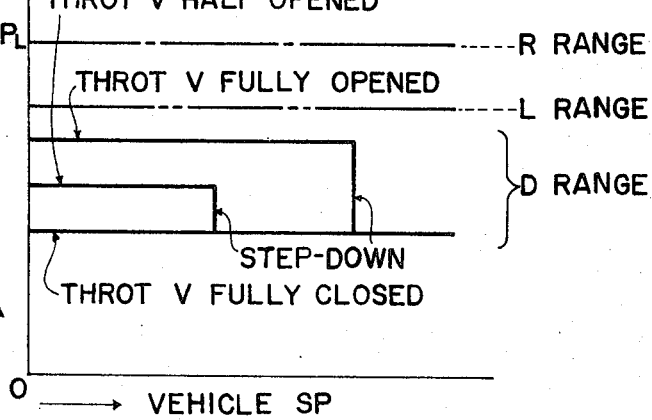
FIG. 4 is a characteristic line diagram of the control hydraulic pressure obtainable in the hydraulic control system according to this invention.

The situation described above is the preferable controlling hydraulic pressure for ordinary running conditions, however, in D position (drive range) of the manual valve, the vehicle is running at high speed, when engine braking is required. If manual valve 57 is shifted to the L position (low range) the engine brake may be obtainable, however if the characteristic of hydraulic pressure are the same as at the D position the line pressure PL for the operation of brake band 21 would be comparatively low and insufficient to actuate effectively the engine brake as shown in FIG. 4 because the engine throttle valve is usually fully closed in case of engine-braking. And at the low range of manual valve 57, it is preferable to have the high line pressure always maintained constant irrespective of the vehicle speed like the control pressure shown by the two dash-dot-dash-line in FIG. 4. Also at R position (reverse speed range) of manual valve 57 the brake power acting on the brake band 22 must be much stronger than that at any other position, so that it is desirable to obtain a much higher line pressure PL like the control pressure shown by the dot-dash-line in FIG. 4.

Throttle valve 58

The valve 61 is supplied only with the throttle pressure ($Pth$) through line 104, since the ball 71 in both positions serves to separate line 104 from line 102. The valve 59 is supplied, through line 108 either with the throttle pressure ($Pth$) or with the line pressure (PL) in accordance with the position of ball 71. The supply of the line pressure (PL) to the valve 59 is carried out at kick down at which line 102 is communicated with line 101.

Figure 3A:
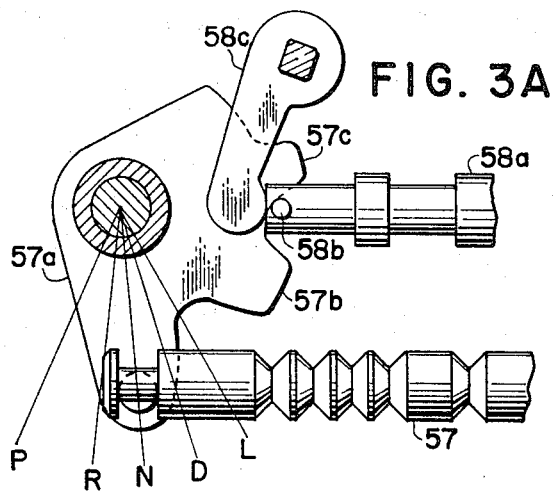
FIGS. 3A and B are views of a link mechanism of one embodiment of this invention.
Figure 3B:
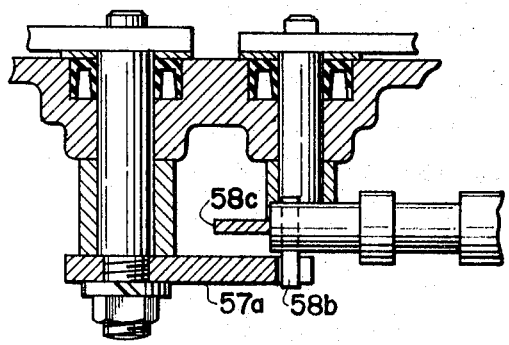
FIG. 3B is a plan view including a partial section of FIG. 3A.

An important point in this invention, as previously described, is to obtain required high line pressure PL, creating a high throttle pressure $Pth$ by pushing in the throttle plug 58a of throttle valve 58 as much as required at low (L) and reverse (R) positions by means of a link mechanism operably interconnected with the manual valve 57 for performing the above object without additional provision of special control circuits. The arrangement contemplated herein is shown in FIGS. 3A and B. The throttle valve plug 58a is given a right directional movement proportional to the engine throttle valve opening by a lever 58c cooperating with the engine throttle valve opening, so that the throttle pressure $Pth$ proportional to this movement is created. However, for the low speed L range and reverse speed R range, a portion of a lever 57a operated by the manual valve 57 is made in a cam form, so that in low speed L range a part 57b of lever 57a and at reverse speed R range a part 57c of lever 57a each acts to push the throttle plug 58a through a pin 58b fixed to the throttle plug 58a. In this way, the prescribed throttle pressure $Pth$ is produced and the required line pressure PL is obtainable.

As hereinbefore explained, it is the objective of the present invention to easily accomplish the actuating of the throttle plug to cause a necessary displacement by means of a link operating on manual valve 57 without the necessity of providing any special circuit therefor in order to obtain the high control line pressure required at the time of engine braking at low L position and also at reverse R position, the hydraulic control system can be minimized in size and simplified in constitution.

It is to be observed therefore that the present invention provides for an improvement in an automatic transmission hydraulic control system which provides high hydraulic pressure required by hydraulic servo units when applying engine brake at low position according to the shift position of a manual valve 27. In general, the system has a displacement mechanism including a throttle plug, (58a) for providing a movement proportional to a throttle valve 58 opening and, a pressure regulator valve 54 regulating the pressure supplied to said servo units, the improvement comprises having in cooperation with throttle plug 58a, a displacement lever mechanism 57a, operably interconnected with said manual valve 57 at one end, and, engaged with said throttle plug 58a at the other end, said displacement lever mechanism 57 having displacing edged portions 57b, 57c, for selectively operating the throttle plug 58a at the low and at the reverse ranges of the manual valve 57. In this way, when shifting the manual valve 57 to the low or reverse range, a requisite high throttle pressure is created in the servo units by forcible moving the throttle plug 58a the required displacement independently of other units associated with the engine throttle valve to force-circulate pressure to said pressure regulator valve 54 of said servo units and at the same time, maintaining a constant high line pressure to said servo units thus applying line pressure to said servo units to obtain a sufficiently effective braking power for the servo units at low and reverse speeds.

The throttle plug 58a includes a length of rod with a protruding end. The manual valve 57 including a length of stick capable of longitudinal substantially parallel displacement with respect to said rod to provide low and reverse range positions. The lever mechanism 57a has a pivoted angle apex portion, a side, extending from this apex portion and connected to the stick, and, a cam face portion with protruding low and reverse edges 57b, 57c corresponding to the low and reverse speed shift positions. These cam face portion edges 57b, 57c engage the throttle plug rod protruding end at the respective low and reverse speed shift positions.

We claim:

1. In an automatic transmission hydraulic control system which provides high hydraulic pressure required by hydraulic servo units at low and reverse range according to the shift position of a manual valve (57), said system having a displacement mechanism including a throttle plug (58a) for providing a movement proportional to a throttle valve (58) opening and, a pressure regulator valve (54) regulating the pressure supplied to said servo units, the improvement therein comprising; having, in cooperation with said throttle plug (58a), a displacement lever mechanism (57a) operably inter-connected with said manual valve (57) at one end, and, engaged with said throttle plug (58a) at the other end, said displacement lever mechanism (57a) having displacing edged portions (57b, 57c) for selectively operating said throttle plug at the low and at the reverse ranges of the manual valve (57) so that when shifting said manual valve (57) to the low or reverse range, a requisite high throttle pressure is created in said servo units by forcible moving said throttle plug 58a the required displacement independently of other units associated with said engine throttle valve to force-circulate pressure to said pressure regulator valve (54) of said servo units and at the same time, maintaining a constant high line pressure to said servo units thus continuously applying line pressure to said servo units to obtain a sufficiently effective braking power for the servo units at low and reverse speeds.

2. In a system as claimed in claim 1, said throttle plug (58a) including a length of rod with a protruding end, said manual valve (57) including a length of stick capable of longitudinal substantially parallel displacement with respect to said rod to provide low and reverse range positions, said lever mechanism (57a) having a pivoted angle apex portion, a side, extending from said apex portion connected to said stick, and, a cam face portion with protruding low and reverse edges (57b, 57c) corresponding to said low and reverse speed shift positions, said cam face portion edges engaging said rod protruding end at said respective low and reverse speed shift positions.

References Cited

UNITED STATES PATENTS

| | | | |
|---|---|---|---|
| 2,611,281 | 9/1952 | Gray et al. | 74—843 |
| 2,648,992 | 8/1953 | Vincent | 74—865 |
| 2,977,816 | 4/1961 | Rice | 74—865 |
| 3,096,666 | 7/1963 | Christenson et al. | 74—867X |
| 3,340,746 | 9/1967 | Hamilton | 74—865 |
| 3,370,488 | 2/1968 | Hamilton | 74—865 |

ARTHUR T. McKEON, Primary Examiner